(12) United States Patent
Verdonk

(10) Patent No.: US 6,253,072 B1
(45) Date of Patent: Jun. 26, 2001

(54) METHOD AND SYSTEM FOR DYNAMICALLY UPDATING RATE CENTER INFORMATION

(75) Inventor: Timothy C. Verdonk, Redmond, WA (US)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/212,648

(22) Filed: Dec. 16, 1998

(51) Int. Cl.[7] .................................................. H04M 15/00

(52) U.S. Cl. ............................................ 455/406; 455/405

(58) Field of Search ...................................... 455/405, 406, 455/433, 432; 379/111, 112, 113, 114, 115, 126

(56) References Cited

U.S. PATENT DOCUMENTS 6,070,076 * 5/2000 Valentine .............................. 455/445

* cited by examiner

Primary Examiner—Lee Nguyen
(74) Attorney, Agent, or Firm—John D. Crane; Bracewell & Patterson, L.L.P.

(57) ABSTRACT

A method and system are disclosed for dynamically updating billing information for a mobile subscriber unit when a long distance call is delivered to the mobile subscriber unit. First, a request to terminate a call at a mobile subscriber unit is detected. Next, in response to detecting the request to terminate a call at the mobile subscriber unit, a rate center that is currently serving the mobile subscriber unit is automatically identified. Finally, the identification of the serving rate center is automatically delivered to a billing database, such that the billing database is dynamically updated and is utilized to promptly report accurate billing information to a subscriber.

20 Claims, 4 Drawing Sheets

METHOD AND SYSTEM FOR DYNAMICALLY UPDATING RATE CENTER INFORMATION

BACKGROUND OF THE INVENTION

1. Technical Field

The present invention relates, in general, to an improved wireless communications system. In particular, the present invention relates to a method for updating billing information associated with a mobile subscriber unit. Still more particularly, the present invention relates to a method for dynamically updating billing information for a mobile subscriber unit when a long distance call is delivered to the mobile subscriber unit.

2. Description of the Related Art

A cellular telephone system typically includes mobile subscriber units that may be mobile or portable, and cellular base stations that are connected to the public telephone company via one or more cellular switching networks. Each cellular subscriber has an assigned cellular telephone number that allows the user to place and receive calls within a widespread range of the cellular base stations, such as throughout a metropolitan area. Cellular telephone systems are thus based on a structure of associated cells. Each cell constitutes a specified geographic area that (a) is defined for a specific mobile communications system; and (b) has its own base station and a single controller interconnected with a public telephone network.

In existing radio telecommunications networks, billing information is not immediately available to subscribers. Typically a call may span several mobile switching centers (MSCs), and toll ticketing (TT) records are generated in each MSC which participated in processing the call. Once the call is completed, the TT records from each MSC are stored on a hard disk memory device for that MSC. Once a day, or once a week, whatever an operator's practice may be, the TT records may be backed up on magnetic tape. In addition, the TT records may be transferred via a data-transfer portal (an X25 or TCP/IP portal for example) within the MSC to an external billing center for post processing. The external billing center may belong to a particular operator and may process only that operator's TT records, or the center may process records from several operators. Operators who have their own post-processing facilities generally transfer their TT record files via a dedicated link from the MSC to their local post-processing facility. Once in the billing center, the TT records are processed and billing information is generated and sent to the respective operators. The billing information is then utilized to settle accounts between operators for automatic roaming services and to bill individual subscribers.

Users often desire to make toll calls via mobile communication devices, such as cellular telephones. In public switched telephone systems, including those that incorporate mobile cellular telephone systems, a toll is a charge for a connection to a central office or a user end instrument that is beyond a call originator exchange boundary. The amount of a toll (i.e., toll call) is usually based on various factors, such as distance, the number of exchanges utilized, duration of the call, time of day, locations of call originator and call receiver, type or class of service, and extent of utilization.

When a mobile phone is called, a gateway mobile switching center (G-MSC) obtains a Temporary Location Directory Number (TLDN) from a serving mobile switching center (S-MSC) for the purpose of routing the call to the mobile. The wireless customer is typically billed for toll charges from the originating rate center to the terminating rate center. However, the TLDN does not necessarily indicate the rate center in which the terminating mobile is located. In order minimize trunk backhaul and simplify allocation of TLDNs, it is common practice to assign a TLDN from the rate center in which the S-MSC is located, not the rate center in which the mobile telephone is located. For example, a switch located in Vancouver would assign a Vancouver TLDN but the mobile itself could be located on a cell site in the interior region of British Columbia, hundreds of miles from the city of Vancouver.

If the home carrier wants to know in which rate center a mobile was located on an incoming call, the home carrier must wait for the serving carrier to send this information. This information typically takes more than a month to pass through a "clearinghouse". Hence, the subscriber gets billed for calls received outside his home network several months after the calls were actually placed to the mobile. Subscribers may forget about calls they received months ago and dispute charges. Moreover, delayed billing results in delayed revenue for the subscriber's carrier.

From the foregoing it can be appreciated that a need exists to provide a method and system to send back the last known serving rate center from the S-MSC to the G-MSC so that the home carrier can record the serving city for incoming calls to the subscriber on the subscriber's billing statement and ensure more accurate toll billing for incoming calls to mobiles.

SUMMARY OF THE INVENTION

It is therefore one object of the present invention to provide an improved wireless communications telephone system.

It is another object of the present invention to provide a method for updating billing information associated with a mobile subscriber unit.

It is yet another object of the present invention to provide a method for dynamically updating billing information for a mobile subscriber unit when a long distance call is delivered to the mobile subscriber unit.

The above and other objects are achieved as is now described. A method and system are disclosed for dynamically updating billing information for a mobile subscriber unit when a long distance call is delivered to the mobile subscriber unit. First, a request to terminate a call at a mobile subscriber unit is detected. Next, in response to detecting the request to terminate a call at the mobile subscriber unit, a rate center that is currently serving the mobile subscriber unit is automatically identified. Finally, the identification of the serving rate center is automatically delivered to a billing database, such that the billing database is dynamically updated and is utilized to promptly report accurate billing information to a subscriber.

BRIEF DESCRIPTION OF THE DRAWINGS

The novel features believed characteristic of this invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
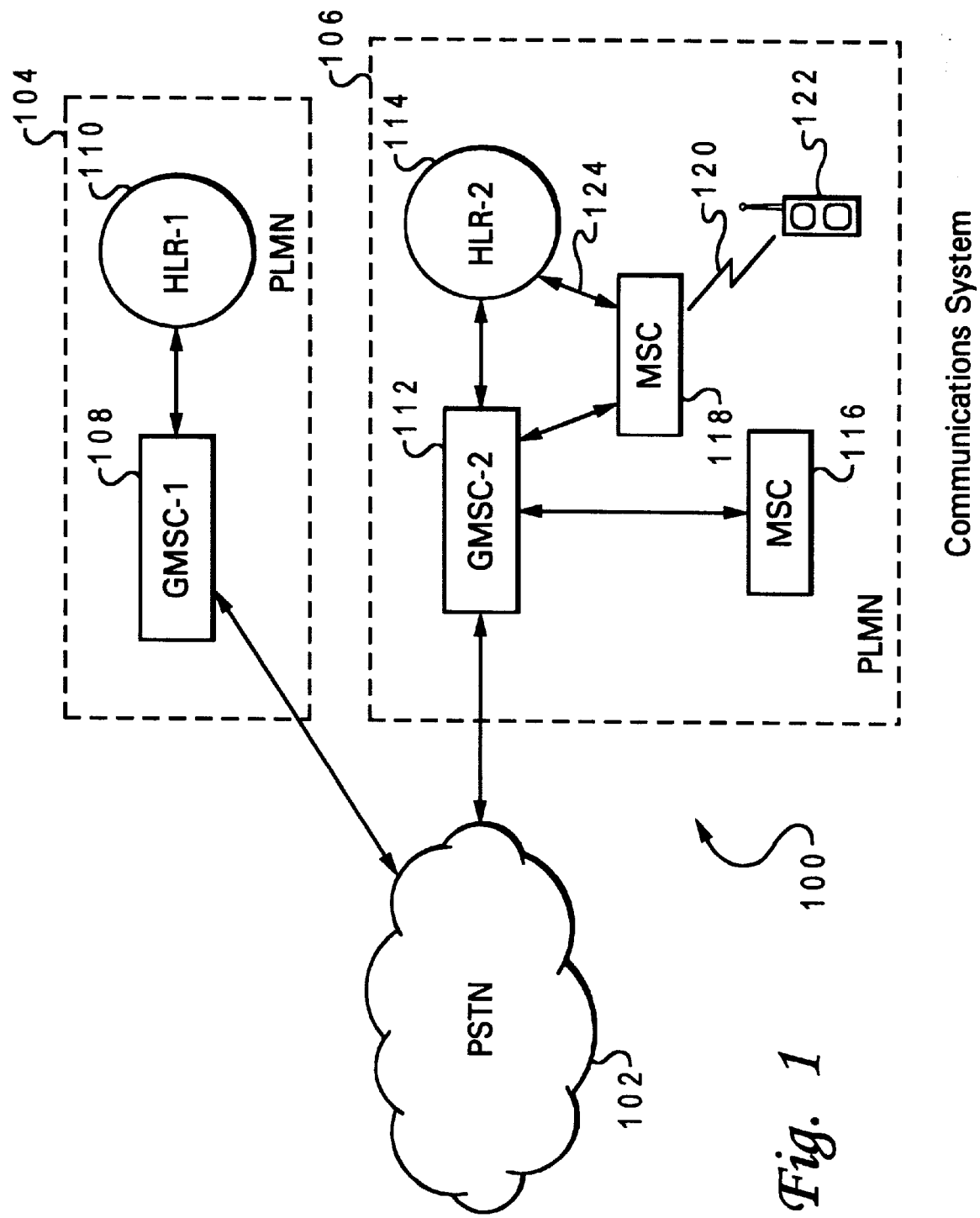
FIG. 1 depicts a diagram of a communications system in which a preferred embodiment of the present invention may be implemented.

With reference now to the figures and in particular with reference to FIG. 1, there is depicted a block diagram illustrative of an example physical configuration of a communications system 100 in accordance with the present invention. FIG. 1 is a block diagram illustrating the network interconnection of multiple Public Land Mobile Networks (PLMN) 104 and 106 to a Public Switched Telephone Network (PSTN) 102. A mobile subscriber unit (MSU) 122 (also known as a mobile terminal or equivalent) is associated with one of the PLMNs as the home PLMN 106. Within each of PLMNs 104 and 106, there are a number of different mobile switching centers (MSC, or also referred to as an MSC/VLR) servicing the geographic area covered by the network. One such MSC/VLR, MSC/VLR 118 communicates with the MSU 122 via a radio channel 120.

MSCs 108, 112, 116 and 118 are responsible for the switching of trunk circuits as well as the processing of call setup and mobility management signaling messages. MSCs 108, 112, 116 and 118 can control system operations in wireless networks. For example, MSCs 108, 112, 116 and 118 can control calls, track billing information, and locate MSU 122. MSCs 108, 112, 116 and 118 are thus switches that provide services and coordination between external networks and mobile cellular telephones utilized in networks such as communications system 100.

Within each of PLMNs 104 and 106, there exists a Gateway Mobile Switching Center (G-MSC) 108 and a G-MSC 112 respectively. G-MSCs 108 and 112, are utilized for routing incoming calls intended for MSU 122 to the appropriate MSC/VLR and, in some instances, may be integrated with an MSC/VLR. As an illustration, if PLMN 106 is the home PLMN for MSU 122, a call initiated within the PSTN 102 is first routed to the GSMC 112. The G-MSC 112 then sends a signal requesting routing information to a Home Location Register (HLR) 114 serving MSU 122 (this step is hereinafter referred to as HLR interrogation). HLRs such as HLR 114 residing within PLMN 106, and HLR 110 that resides within PLMN 104 are utilized to store subscriber information and keep track of the current location of resident MSUs. In response to the request by G-MSC 112 for routing information for MSU 122, HLR 114 returns a routing instruction, in the form of a Temporary Location Directory Number (TLDN), back to G-MSC 112. HLR 114 accomplishes this by requesting the TLDN from serving MSC/VLR 118 via a signaling link 124. Signaling link 124 may be established by a direct connection between HLR 114 and MSC/VLR 118. Signaling link 124 may also be established utilized a signaling network. A routing instruction is then utilized to relay the TLDN from HLR 114 to G-MSC 112. The returned routing instruction includes a network address indicating that MSC/VLR 118 is currently serving MSU 122. Upon receipt of such routing information, the G-MSC 112 transmits the incoming call to the indicated MSC/VLR 118. The serving MSC/VLR 118 then establishes a call connection over radio link 120 with MSU 122 located within its MSC/VLR serving area.

Such HLR interrogation by the G-MSC 112 is necessary because MSU 122 is not tied to a fixed line or geographic location. Because MSU 122 can travel freely into any one of the MSC/VLR areas within a given PLMN, the MSC/VLR serving MSU 122 does not stay constant. Whenever MSU 122 travels into a different MSC/VLR coverage area, or when MSU 122 is turned on for the first time, the serving MSC/VLR 118 performs a location update process with the HLR 114 to inform HLR 114 of the MSU's current location. As a result, the HLR 114 retains the current location information regarding the MSU 122 regardless of which MSC/VLR 118 is currently serving the MSU 122. Subsequently, whenever the GSMC 112 interrogates HLR 114, HLR 114 is able to provide the network address of the MSC/VLR 118 currently serving the MSU 122 by requesting a TLDN from serving MSC/VLR 118 and relaying this TLDN to the G-MSC 112. Utilizing the TLDN received from HLR 114, the GSMC 112 routes the incoming call to the specified MSC/VLR 118.

Figure 2A:
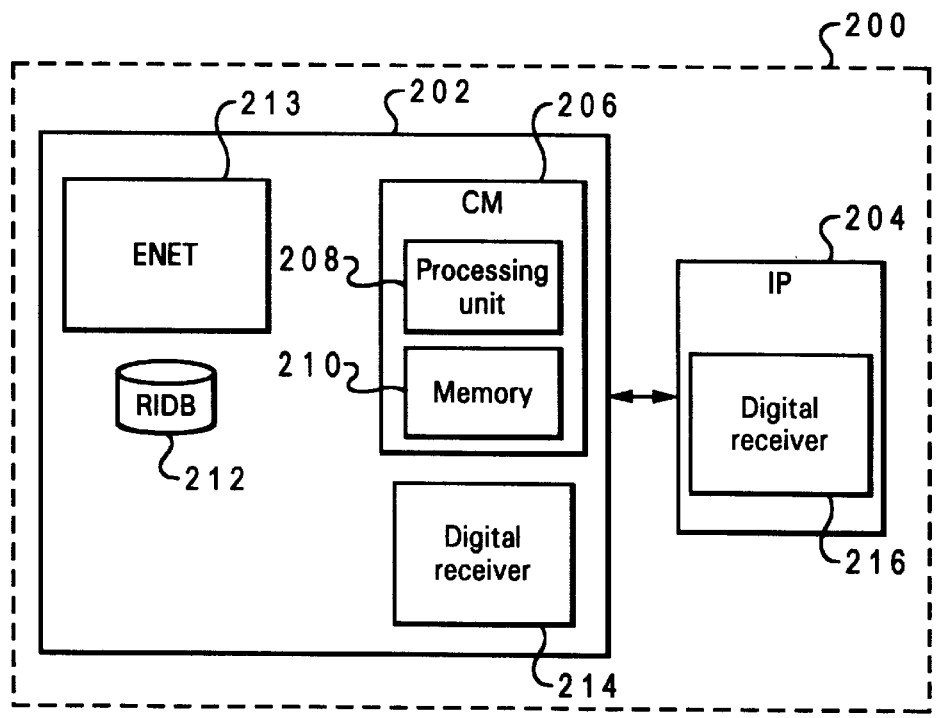
FIG. 2A is a block diagram of a switch in which a preferred embodiment of the present invention may be implemented.
Figure 2B:
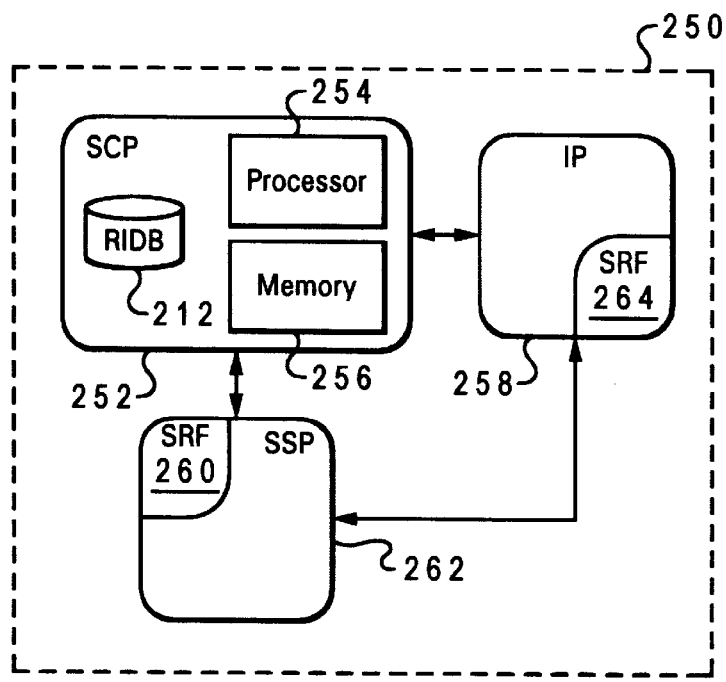
FIG. 2B is a block diagram of physical components in an intelligent network in which a preferred embodiment of the present invention may be implemented.

With reference now to FIGS. 2A–2B, block diagrams illustrating different physical configurations for switch components in which a preferred embodiment of the present invention may be implemented are depicted. FIG. 2A is a block diagram of a physical switch 200 representative of the DMS family of switch products available from Northern Telecom Limited in Ottawa, Canada. Switch 200 may be employed within communications system 100 depicted in FIG. 1 as one of MSCs 108, 112, 116, or 118 and provides the functionality described with reference to FIG. 1.

Switch 200 as depicted in FIG. 2A includes a central unit 202 connected to intelligent peripheral (IP) 204. Central unit 202 contains a computing module (CM) 206, which employs processing unit 208 and memory 210 to provide switch intelligence functions for switch 200. Processing unit 208 may comprise, for example, one or more processors executing instructions to provide logic for call processing and to implement processes described below for a preferred embodiment of the present invention. Memory 210 stores instructions and data and may include random access memory (RAM) and/or read only memory (ROM).

Central unit 202 also includes enhanced network (ENET) 212, which provides a switch fabric function. Central unit 202 also includes an integral routing information database (RIDB) 212. Voice server functions for switch 200 are provided by intelligent peripheral (IP) 204, which also contains digital receiver 216. Digital receiver 216 along with another digital receiver 214, that is located within central unit 202, may provide voice recognition functions in place of or in addition to recognizing DTMF tones.

FIG. 2B depicts a block diagram of physical components in an intelligent network 250 representative of a International Telecommunications Union switch, defined by ITUT Q.1200. Network 250 may be implemented within telecommunications network 102 as MSCs 108, 112, 116 or 118 in FIG. 1 in accordance with the preferred embodiment of the present invention. Network 250 includes a service control platform (SCP) 252, which is the switch intelligence for network 250. Within service control platform 252 is a processor unit 254 and a memory 256, which contain the processing logic for providing per call real-time billing rate display in the depicted example. Additionally, service control platform 252 also contains a routing information database (RIDB) 212. Network 250 also contains a service switch platform (SSP) 262, which provides switch fabric functions. Specialized resource functions (SRFs) 260 is found within service switch platform 262. Specialized resource function (SRF) 260 provides DTMF functions for recognizing signals from consumer premises equipment. An intelligent peripheral (IP) 258 also is a part of network 250 and provides voice server functions. Additionally, within intelligent peripheral 258 is specialized resource function 264, which also serves to provide DTMF functions. Alternatively, instead of DTMF functions, specialized resource functions 260 and 264 may be employed to provide voice recognition in place of or in addition to recognizing DTMF tones.

Although the examples in FIGS. 1, and 2A–2B depict switches as the environments in which the processes of the present invention may be implemented, the processes of may also be implemented in other data processing systems. For example, the processes of the present invention may be implemented within a computer having a connection to a switch, with the computer providing the logic and commands to the switch to execute the processes. Alternatively, the processes may be implemented to operate in an intelligent device operating in conjunction with a switch.

Figure 3A:
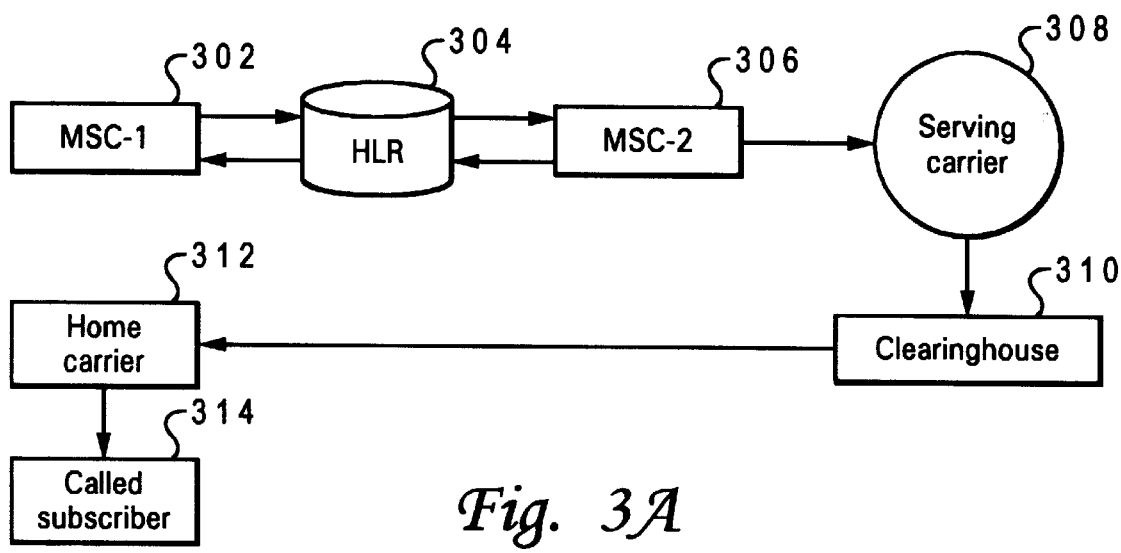
FIG. 3A is a simplified block diagram illustrating a system for collecting toll ticket information upon which a preferred embodiment of the present invention may be implemented.

FIG. 3A is a simplified block diagram illustrating a system for collecting toll ticket information for a long distance call sent to a mobile subscriber unit upon which a the present invention may be implemented. A gateway MSC (MSC-1) 302 receives a request to place a call to a MSU (hereinafter the terminating MSU) that is currently outside its home network. MSC-1 302 responds to the request by sending a request to a HLR 304 to locate the terminating MSU. HLR 304 stores the permanent records and profile information associated with the terminating MSU including the identity of a serving MSC (MSC-2) 306 that is currently serving the terminating MSU. HLR 304 requests a routing number from MSC-2 306 that will be utilized to route the incoming call. MSC-2 306 responds by sending a Temporary Location Directory Number (TLDN) back to HLR 304, and HLR 304 in turn relays the TLDN back to MSC-1 302.

The TLDN sent from the serving MSC-2 306 to the originating MSC-1 302 is directly associated with MSC-2 306. Therefore, the TLDN identifies the rate center in which MSC-2 306 is located which may not be the same as the rate center in which the terminating MSU is located when the call is received. Since the originating MSC-1 302 receives no definitive information with which to locate the terminating MSU, home carrier 312 must wait until this information can be provided via serving carrier 308 and clearinghouse 310. The current means of obtaining rate center information is therefore independent from the steps taken to route and place the call.

Figure 3B:
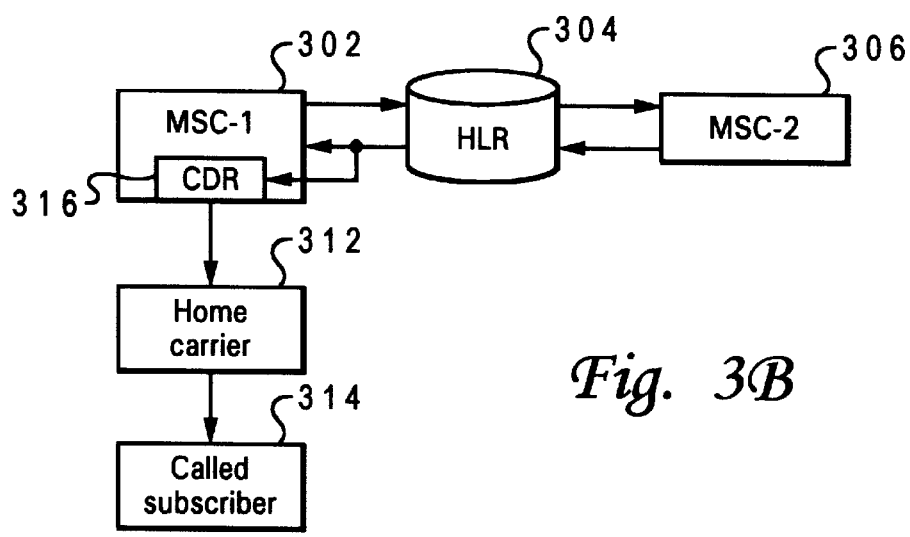
FIG. 3B is a simplified block diagram depicting modifications made to the system for collecting long distance billing information in accordance with the present invention.

FIG. 3B is a simplified block diagram depicting modifications made to the system which result in the integration of billing and call placement in accordance with the teachings of the present invention. The method of routing an incoming call comprises the same steps as described in connection with FIG. 3A. In FIG. 3B, however, the routing signal sent from MSC-2 306 to HLR 304 includes the an additional parameter that identifies the rate center in which the terminating MSU currently resides. Therefore the same TLDN that is utilized in FIG. 3A to place the call and which is associated with the serving MSC-2 306 is again sent but with an additional rate center identification parameter. The TLDN is utilized in the normal manner to route the call and the rate center identification parameter is placed in a call detail record 316 in which billing information is stored. The home carrier 312 can therefore quickly obtain an accurate toll ticket from originating MSC-1 302 and bill the called subscriber 314 in a timely manner.

In order to follow a call through a plurality of MSC's and gather records from each MSC involved in the call, modifications are made to intersystem signaling messages. In a preferred embodiment of the present invention, the ANSI-41 intersystem signaling protocol is utilized. ANSI-41 is hereby incorporated by reference in its entirety herein.

The ANSI-41 message modifications involve the addition of a new data element to selected ANSI-41 messages depending upon the particular call scenario. However, regardless of the call scenario, two ANSI-41 messages must be modified to deliver applicable rate center information. These two messages are the Route Request Return Result (RoutReq RR) message and the Location Request Return Result (LocReq RR) message.

Figure 4:
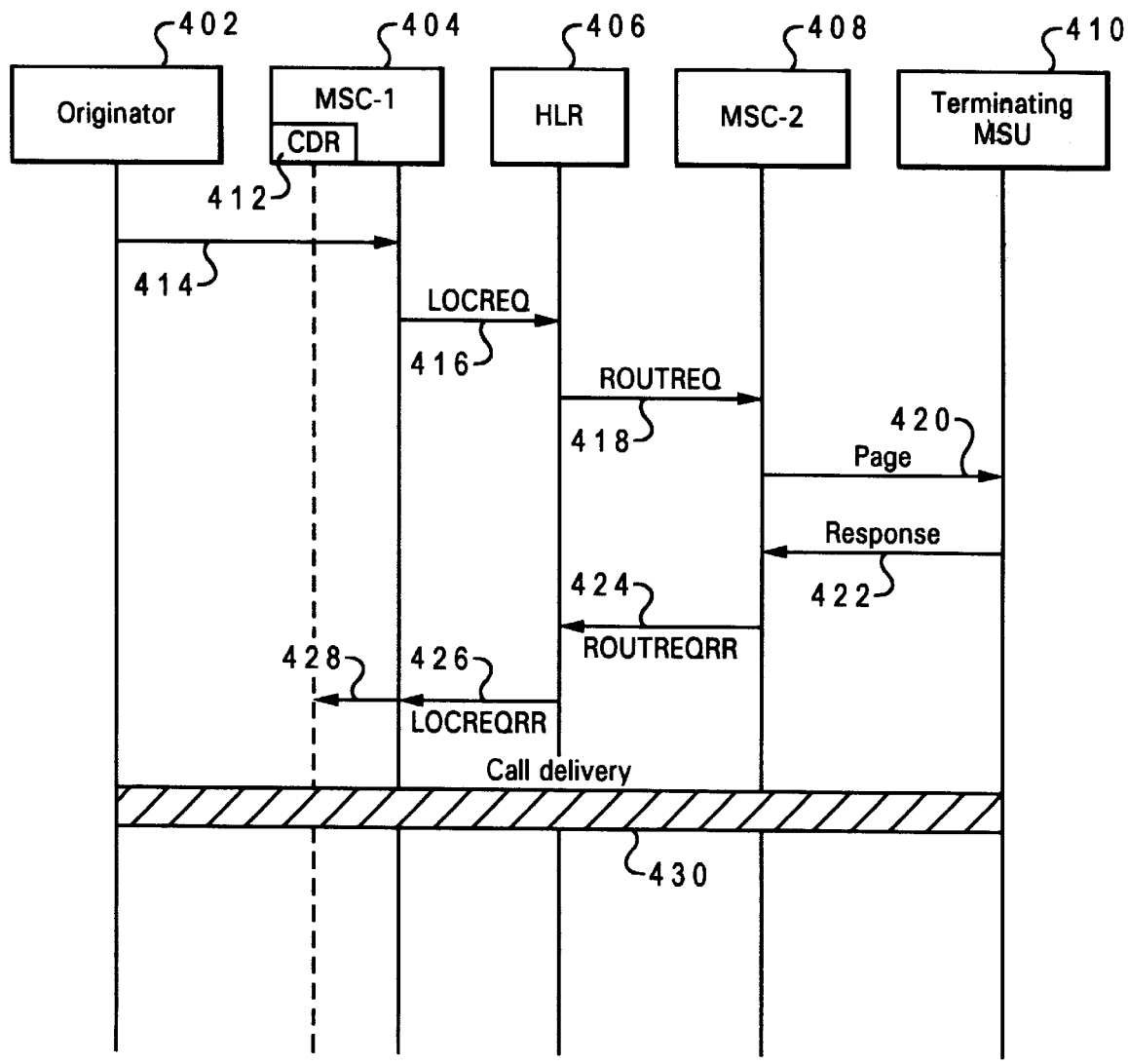
FIG. 4 is a message flow diagram illustrating the ANSI-41 signaling messages involved in requesting rate center information during routing of a long distance call in accordance with the teachings of the present invention.

FIG. 4 is a message flow diagram illustrating the ANSI-41 signaling messages involved in placing a call from an originator 402 in a gateway MSC (MSC-1) 404 to a terminating MSU 410 that is being served by a serving MSC (MSC-2) 408. Note that as utilized herein, the term "originator" is not necessarily synonymous with a human operator. An originator can be a human operator or an electrical device such as a computer. The term "originator" can refer to the device from which a cellular or wireline telephone call originates.

For simplicity, the message flow diagrams utilized herein do not illustrate radio base transceiver stations between each MSC and the MSUs operating in each MSCs respective coverage area since the base transceiver station do not affect the network signaling relevant to the present invention. However, it is understood that such base transceiver stations exist and provide radio interface link between the MSCs and the MSUs. At 414, an originator 402 places a call to terminating MSU 410. MSC-1 404 sends a Location Request Invoke (LocReq Inv) message 416 to its home location register (HLR) 406. The HLR 406 sends a Routing Request Invoke (RoutReq Inv) message 418 to MSC-2. The RoutReq Inv message 418 alerts MSC-2 to send the associated rate center information along with the usual routing number which in a preferred embodiment of the present invention is a TLDN. In a preferred embodiment of the present invention the MSC-2 408 sends the rate center information as an additional element in the normal Routing Request Return Response (RoutReq RR) 424.

The remainder of the call setup process is standard in accordance with ANSI-41. Following a page 420 and a response 422 from terminating MSU 410, MSC-2 returns a Routing Request Return Result (RoutReq RR) message 424 to HLR 406. HLR 406 then sends a Location Request Return Result (LocReq RR) message 426 which also includes rate center information to MSC-1 404. Thereafter, call delivery is completed at 430.

Preferred implementations of the invention include implementations as a computer system programmed to execute the method or methods described herein, and as a program product. According to the computer system implementation, sets of instructions for executing the method and methods are resident in RAM of one or more computer systems configured generally as described above. Until required by the computer system, the set of instructions may be stored as a computer-program product in another computer memory, for example, in a disk drive (which may include a removable memory such as an optical disk or floppy disk for eventual utilization in disk drive).

The computer-program product can also be stored at another computer and transmitted when desired to the user's workstation by a network or by an external communications network. One skilled in the art can appreciate that the physical storage of the sets of instructions physically changes the medium upon which it is stored so that the medium carries computer-readable information. The change may be electrical, magnetic, chemical, or some other physical change. While it is convenient to describe the invention in terms of instructions symbols, characters, or the like, the reader should remember that all of these and similar terms should be associated with the appropriate physical elements. Thus, a method for implementing the steps depicted in FIG. 4, can be accomplished with a computer-aided device. In such a method, data stored in a memory unit of a data-processing system such as a data-processing system, can represent steps in a method for implementing a preferred embodiment of the present invention.

The embodiments and examples set forth herein are presented in order to best explain the present invention and its practical application and to thereby enable those skilled in the art to make and utilize the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A method in a communications system for dynamically updating billing information for a mobile subscriber unit when a long distance call is delivered to said mobile subscriber unit, said method comprising the steps of:
   detecting a request to terminate a call at a mobile subscriber unit;
   automatically identifying a rate center that is currently serving said mobile subscriber unit in response to said step of detecting a request to terminate a call at a mobile subscriber unit; and
   automatically delivering identification of said rate center to a billing database, such that said billing database is dynamically updated and is utilized to promptly report accurate billing information to a subscriber.

2. The method of claim 1 wherein said communications system includes a serving switch, said serving switch providing services and coordination between external networks and said mobile subscriber unit, and wherein said step of automatically identifying a rate center that is currently serving said mobile subscriber unit in response to said step of detecting a request to terminate a call at a mobile subscriber unit is performed utilizing said serving switch.

3. The method of claim 2 wherein said step of automatically delivering identification of said rate center to a billing database is performed utilizing said serving switch.

4. The method of claim 3 wherein said communications system includes a home location register, and wherein said step of automatically delivering identification of said rate center to a billing database is comprised of the steps of:
   delivering said rate center information as an additional element in a routing request response from said serving switch to said home location register; and
   delivering said rate center information as an additional element in a location request response from said home location register to said billing database.

5. The method of claim 1 wherein said communications system includes a home rate center that is associated with said mobile subscriber unit, and wherein said home rate center is utilized as said billing database during said step of automatically delivering identification of said rate center to a billing database.

6. The method of claim 1 further comprising the step of:
   utilizing said billing database to provide billing services for said mobile subscriber unit.

7. The method of claim 1 wherein said communications system utilizes ANSI-41 signaling protocol and wherein said step of automatically delivering identification of said rate center to a billing database is performed utilizing said ANSI-41 signaling protocol.

8. A system for dynamically updating billing information for a mobile subscriber unit when a long distance call is delivered to said mobile subscriber unit, said system comprising:
   means for detecting a request to terminate a call at a mobile subscriber unit;
   means for automatically identifying a rate center that is currently serving said mobile subscriber unit in response to said detecting a request to terminate a call at a mobile subscriber unit; and
   means for automatically delivering identification of said rate center to a billing database, such that said billing database is dynamically updated and is utilized to promptly report accurate billing information to a subscriber.

9. The system of claim 8 wherein said means for automatically identifying a rate center that is currently serving said mobile subscriber unit in response to said detecting a request to terminate a call at a mobile subscriber unit, is a serving switch, said serving switch providing services and coordination between external networks and said mobile subscriber unit.

10. The system of claim 9 wherein said serving switch is utilized as said means for automatically delivering identification of said rate center to a billing database.

11. The system of claim 10 wherein said communications system includes a home location register, and wherein said means for automatically delivering identification of said rate center to a billing database is comprised of:
   means for delivering said rate center information as an additional element in a routing request response from said serving switch to said home location register; and
   means for delivering said rate center information as an additional element in a location request response from said home location register to said billing database.

12. The system of claim 11 wherein said home location register is utilized to maintain subscriber information for said mobile subscriber unit.

13. The system of claim 8 further comprising a home rate center that is associated with said mobile subscriber unit, and wherein said home rate center is utilized as said billing database.

14. The system of claim 8 further comprising:
   means for utilizing said billing database to provide billing services for said mobile subscriber unit.

15. The system of claim 8 wherein said communications system utilizes ANSI-41 signaling protocol and wherein said means for automatically delivering identification of said rate center to a billing database is said ANSI-41 signaling protocol.

16. A computer program product stored in signal bearing media for dynamically updating billing information for a mobile subscriber unit when a long distance call is delivered to said mobile subscriber unit, said computer program product comprising:

instruction means stored in signal bearing media for detecting a request to terminate a call at a mobile subscriber unit;

instruction means stored in signal bearing media for automatically identifying a rate center that is serving said mobile subscriber unit in response to said step of detecting a request to terminate a call at a mobile subscriber unit; and instruction means stored in signal bearing media for automatically delivering identification of said rate center to a billing database, such that said billing database is dynamically updated and is utilized to promptly report accurate billing information to a subscriber.

17. The computer program product of claim 16 wherein said instruction means stored in signal bearing media for automatically identifying a rate center that is serving said mobile subscriber unit in response to said step of detecting a request to terminate a call at a mobile subscriber unit, is a serving switch, said serving switch providing services and coordination between external networks and said mobile subscriber unit.

18. The computer program product of claim 17 wherein said serving switch is utilized as said instruction means stored in signal bearing media for automatically delivering identification of said rate center to a billing database.

19. The computer program product of claim 16 wherein said communications system utilizes ANSI-41 signaling protocol and wherein said instruction means stored in signal bearing media for automatically delivering identification of said rate center to a billing database utilizes ANSI-41 signaling protocol.

20. The computer program product of claim 16 wherein said communications system includes a home location register, and wherein said instruction means stored in signal bearing media for automatically delivering identification of said rate center to a billing database is comprised of:

instruction means stored in signal bearing media for delivering said rate center information as an additional element in a routing request response from said serving switch to said home location register; and instruction means stored in signal bearing media for delivering said rate center information as an additional element in a location request response from said home location register to said billing database.

* * * * *